(12) United States Patent
Murray et al.

(10) Patent No.: US 9,760,947 B2
(45) Date of Patent: Sep. 12, 2017

(54) SYSTEM AND METHOD FOR INTERACTIVE VIRTUAL BANKING

(71) Applicant: JPMorgan Chase Bank, N.A., New York, NY (US)

(72) Inventors: Sean H. Murray, West Chester, PA (US); Allison A. Keevil, West Grove, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 85 days.

(21) Appl. No.: 14/266,852

(22) Filed: May 1, 2014

(65) Prior Publication Data
US 2014/0236740 A1   Aug. 21, 2014

Related U.S. Application Data

(63) Continuation of application No. 13/297,475, filed on Nov. 16, 2011, now Pat. No. 8,751,393.

(51) Int. Cl.
  *G06Q 40/00*  (2012.01)
  *G06Q 40/02*  (2012.01)
  *G06Q 20/10*  (2012.01)

(52) U.S. Cl.
  CPC .......... *G06Q 40/02* (2013.01); *G06Q 20/10* (2013.01)

(58) Field of Classification Search
  CPC ..................................... G06Q 40/02
  USPC .......................................... 705/42
  See application file for complete search history.

(56) References Cited

U.S. PATENT DOCUMENTS

| | | |
|---|---|---|
| 6,223,983 B1 | 5/2001 | Kjonaas et al. |
| 7,200,578 B2 | 4/2007 | Huddleston et al. |
| 7,258,267 B2 | 8/2007 | Choi |
| 8,306,510 B2 | 11/2012 | Avendano et al. |
| 8,308,058 B2 | 11/2012 | Sarmah et al. |
| 8,370,899 B2 | 2/2013 | Shoval et al. |

(Continued)

FOREIGN PATENT DOCUMENTS

WO   WO2009116827   12/2009

OTHER PUBLICATIONS

"Banks Without Walls", Would you consider talking mortgages with a hologram? Across the Board, Robert P. Barone, Jun. 1993:12.*

(Continued)

*Primary Examiner* — Hai Tran
(74) *Attorney, Agent, or Firm* — Goodwin Procter LLP

(57) ABSTRACT

Embodiments of the invention are directed to a computer-implemented interactive virtual banking system and method for connecting a user environment with a banking environment for facilitating banking transactions. The system may include a computer memory storing a plurality of banking application programs and an interactive virtual environment generator for generating an interactive virtual banking environment, the environment including visual and audio components. The system may additionally include a user input sensing mechanism for accepting and interpreting user voice input received in the interactive virtual banking environment and computer processing components for accessing the stored banking application programs and executing the stored banking programs within the generated interactive virtual banking environment enabling the user to perform banking tasks through voice input to the interactive virtual banking environment.

32 Claims, 10 Drawing Sheets

(56) References Cited

U.S. PATENT DOCUMENTS

| | | | |
|---|---|---|---|
| 2001/0007332 A1 | 7/2001 | Kjonaas et al. | |
| 2001/0011250 A1 | 8/2001 | Paltenghe et al. | |
| 2005/0150945 A1 | 7/2005 | Choi | |
| 2010/0131865 A1* | 5/2010 | Ackley et al. | 715/757 |
| 2010/0131947 A1* | 5/2010 | Ackley et al. | 718/1 |
| 2011/0112964 A1* | 5/2011 | Berntsen et al. | 705/44 |
| 2012/0042365 A1 | 2/2012 | Dotan et al. | |
| 2012/0204307 A1* | 8/2012 | De Mattei et al. | 2/69 |
| 2012/0259778 A1* | 10/2012 | Banerjee et al. | 705/43 |
| 2012/0290719 A1 | 11/2012 | Lee | |
| 2012/0310826 A1 | 12/2012 | Chatterjee | |

OTHER PUBLICATIONS

"Banks without walls", Robert P Barone, v30n5, pp. 12, dated Jun. 1993. Retrieved from Dialog.*

"The adoption of virtual banking: an empirical study", International Journal of Information Management 19 (1999) 63-74, Shaoyi Liao, Yuan Pu Shao, Huaiqing Wang, Ada Chen. Retrieved from Google Scholar.*

NPL Dialog Search Results, dated Jul. 17, 2013. Retrieved from Dialog.

\* cited by examiner

SYSTEM AND METHOD FOR INTERACTIVE VIRTUAL BANKING

RELATED APPLICATIONS

This application is a continuation application of U.S. patent application Ser. No. 13/297,475, filed on Nov. 16, 2011.

TECHNICAL FIELD

Embodiments of the invention are related to systems and methods for facilitating an interactive virtual banking experience enabling account holders to have a real time banking experience in a variety of environments.

BACKGROUND OF THE INVENTION

While many banking customers now perform a multitude of banking tasks online, the online experience can be frustrating for some users and too limiting for other users. Users still are often compelled to travel to conduct banking tasks in person due to the limitations of online banking.

For example, while it is now commonplace to make transfers or write checks through a bank web site, the experience has limited scope as account holders typically do not receive personal feedback during these transactions or confirmations after these transactions.

Furthermore, while loan applications are now often available online, users are often unable to complete them without explanation or interaction. The level of explanation and interaction necessary for completion is typically not available through a financial institution website.

Additionally, current interfaces available for online banking typically require input through a keyboard, thus limiting the use of mobile devices and non-traditional computing devices for such applications.

Accordingly, a solution is needed for enhancing the remote banking experience for users currently conducting banking remotely and furthermore for attracting users who do not yet engage in remote banking because of the difficulties described above or other difficulties encountered during the use of currently available remote banking systems.

SUMMARY OF THE INVENTION

In one aspect of the invention, a computer-implemented interactive virtual banking method is provided for connecting a user environment with a banking environment for facilitating banking transactions. The system may include a computer memory storing a plurality of banking application programs and an interactive virtual environment generator for generating an interactive virtual banking environment. The environment includes visual and audio components. The system additionally includes a user input sensing mechanism for accepting and interpreting user voice input received in the interactive virtual banking environment and computer processing components for accessing the stored banking application programs and executing the stored banking programs within the generated interactive virtual banking environment enabling the user to perform banking tasks through voice input to the interactive virtual banking environment.

In an additional aspect of the invention, a computer-implemented interactive virtual banking method is provided for connecting a user environment with a banking environment for facilitating banking transactions. The method may include storing a plurality of banking application programs in a computer memory and generating an interactive virtual banking environment using a virtual environment generator. The interactive virtual banking environment may include visual and audio components. The method further includes sensing user voice input into the interactive virtual banking environment using a user input sensing mechanism for accepting and interpreting user voice input received in the interactive virtual banking environment. The method may additionally include accessing the stored banking application programs and executing the stored banking programs within the generated interactive virtual banking environment enabling the user to perform banking tasks through voice input to the interactive virtual banking environment.

In yet an additional aspect of the invention, a computer-implemented interactive virtual banking method is provided for connecting a user environment with a banking environment for facilitating banking transactions. The method includes storing a plurality of banking application programs in a computer memory and generating an interactive virtual banking environment using a virtual environment generator. The interactive virtual banking environment includes a three-dimensional holographic rendering of home bank branch of the user, audio cues presented by at least one virtual teller within the home bank branch, and multiple transaction options available accessible through visual and audio input from the user. The method additionally includes sensing user voice input into the interactive virtual banking environment using a user input sensing mechanism for accepting and interpreting user voice input received in the interactive virtual banking environment. In response to the input, the method includes accessing one of the stored banking application programs upon receiving a user selection of a banking transaction and executing the accessed banking program within the generative interactive virtual banking environment enabling the user to perform banking tasks through voice input to the interactive virtual banking environment.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a method and system for facilitating interactive remote banking using a realistic virtual image and varied input options including voice input. The system enables account holders to address banking needs with minimal effort from any location.

The interactive experience may implement hologram or other technology to provide a three-dimensional display of components of a banking system. For example, the display may include multiple bank branches, single bank branches, a teller, or other components that the user would encounter during the "in-person" experience. Embodiments of the invention relate to an interactive banking experience that can be utilized by users from a remote location. The interactive banking experience may be provided through any suitable visual and audio interactive equipment, such as for example, personal computers, kiosks, or televisions.

Embodiments of the system provide users with private bank branches with no lines and a customized visual experience. Once in the bank branch, the user can open a door and decide where to go. For instance, the user may approach a teller window, a loan officer, or a sales office. In embodiments of the invention, users may interact with actual bank personnel through the provisions of a live transaction option that may be incorporated through live video chat or other technology.

Figure 1:
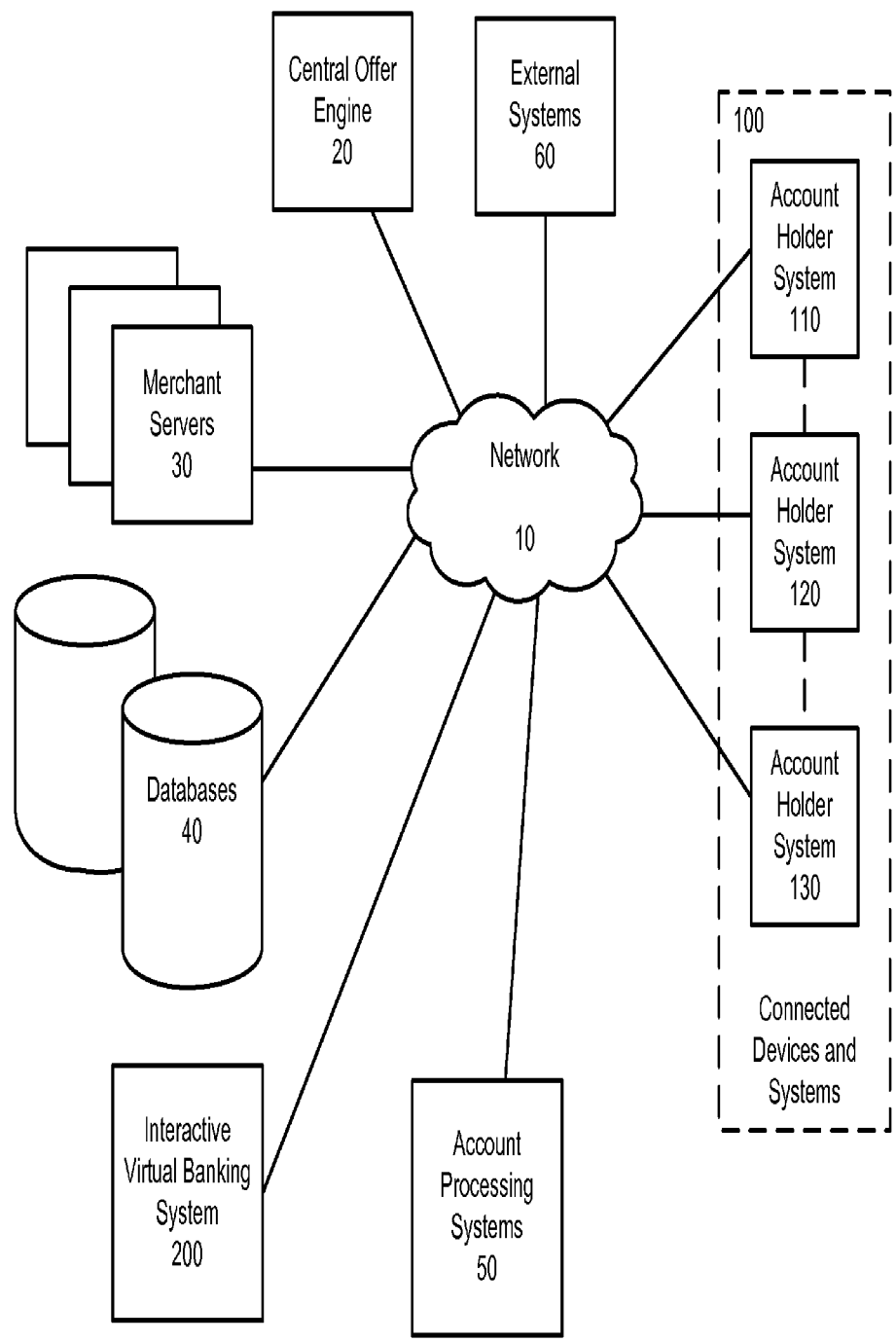
FIG. 1 is a block diagram illustrating an operating environment for an interactive virtual banking system in accordance with an embodiment of the invention.

FIG. 1 is a block diagram illustrating an operating environment for an interactive virtual banking system 200 in accordance with an embodiment of the invention. The interactive virtual banking system 200 may be connected over a network 10 with multiple systems including a central offer engine 20, merchant servers 30, databases 40, and account processing systems 40, and other external systems. Account holder environments 100 may also be connected over the network and may include multiple account holder systems 110, 120 . . . 130. Account holders may additionally be referenced herein as "users". In some cases, users may not be required to be account holders, but may be individuals opting to interacting with the interactive virtual banking environment.

The network 10 may the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths. Wireless data connections used in mobile computing may take a multiple forms. Cellular data service uses technologies including such as 3G networks and 4G networks. These networks are usually available within range of commercial cell towers. Wi-Fi connections may offer higher performance, but have limited range, Some enterprise deployments combine networks from multiple cellular networks or use a mix of cellular, Wi-Fi and satellite. Although one network is shown, a larger number of networks may be provided. All of the system components may communicate over a single network, such as the Internet, or over multiple networks, with the interactive virtual banking system 200.

The interactive virtual banking system 200 may be facilitated through a computer implemented application available over a network such as the Internet or alternatively through television service providers, such as Verizon and Comcast for providing a television application that would enable a user to perform any banking tasks from the user's television.

The interactive virtual banking system 200 provides system users with a realistic interactive experience in real time. The details of the interactive virtual banking system 200 are further described in connection with FIGS. 2-5.

The central offer engine 20 generates offers for system users. The offer engine 20 may be a pre-existing component of a banking system that provides offers based on monitored user behavior. For example, users may engage in various purchasing activities or account activities that cause offers to be generated. When users enter the virtual bank branch they may see offers generated by the central offer engine 20.

The merchant servers 30 may be linked to the interactive virtual banking system 200 in order to fully integrate the user purchasing experience. The merchant servers 30 may be linked to Point of Sale (POS) devices that transmit purchase information. POS terminals may be disposed at the location where a transaction occurs. A POS terminal may refer to the hardware and software used for checkouts. A retail POS system typically includes a computer, monitor, cash drawer, receipt printer, user display and a barcode scanner, and a debit/credit card reader. It can also include a weight scale, integrated credit card processing system, a signature capture device and a user pin pad device. Many POS monitors use touch-screen technology for ease of use and a computer is built in to the monitor chassis for what is referred to as an all-in-one unit. The POS system software can typically handle a myriad of user based functions such as sales, returns, exchanges, layaways, gift cards, gift registries, user loyalty programs, and quantity discounts. Partners may include, for example, travel partners, such airlines, hotels, or rental cars, dining partners, entertainment partners, or partners marketing other goods or services.

In embodiments of the invention, the interactive virtual banking system 200 may be utilized to partner with the merchant servers 30. For example, the user may be car shopping and may browse through a car lot provided on the three dimensional display. After the user selects a car through providing input by grabbing the keys for a particular vehicle and having this motion sensed, or by verbal indication, the system may provide the user with a next screen for applying for a car loan. Such a system may be implemented with any type of merchant partner through merchant server 30. With other types of merchants, the user may be provided with a pre-approved credit card offer on the three dimensional display after reaching out to grab a particular available item. The user may complete the credit card application through the same system and ultimately may also pay for the purchase through the same system.

Databases 40 may store information pertaining to the users in the system. The information may include, for example, demographic information, account data, purchasing behaviors, or other information.

Account processing systems 40 may include pre-existing account processing systems associated with a financial institution. For example, the account processing systems 40 may process transactions for debit, credit, checking, or savings accounts.

Other external systems 60 may also communicate with the interactive virtual banking system 200.

Account holder systems 110, 120 . . . 130 preferably encompass a universe of each user's connected devices. An exemplary account holder system 300 is illustrated and further described below in connection with FIG. 3. However, it should be understood and the type and number of connected devices may be virtually unlimited and may encompass both public and private devices to which the users do not have exclusive access.

Figure 2:
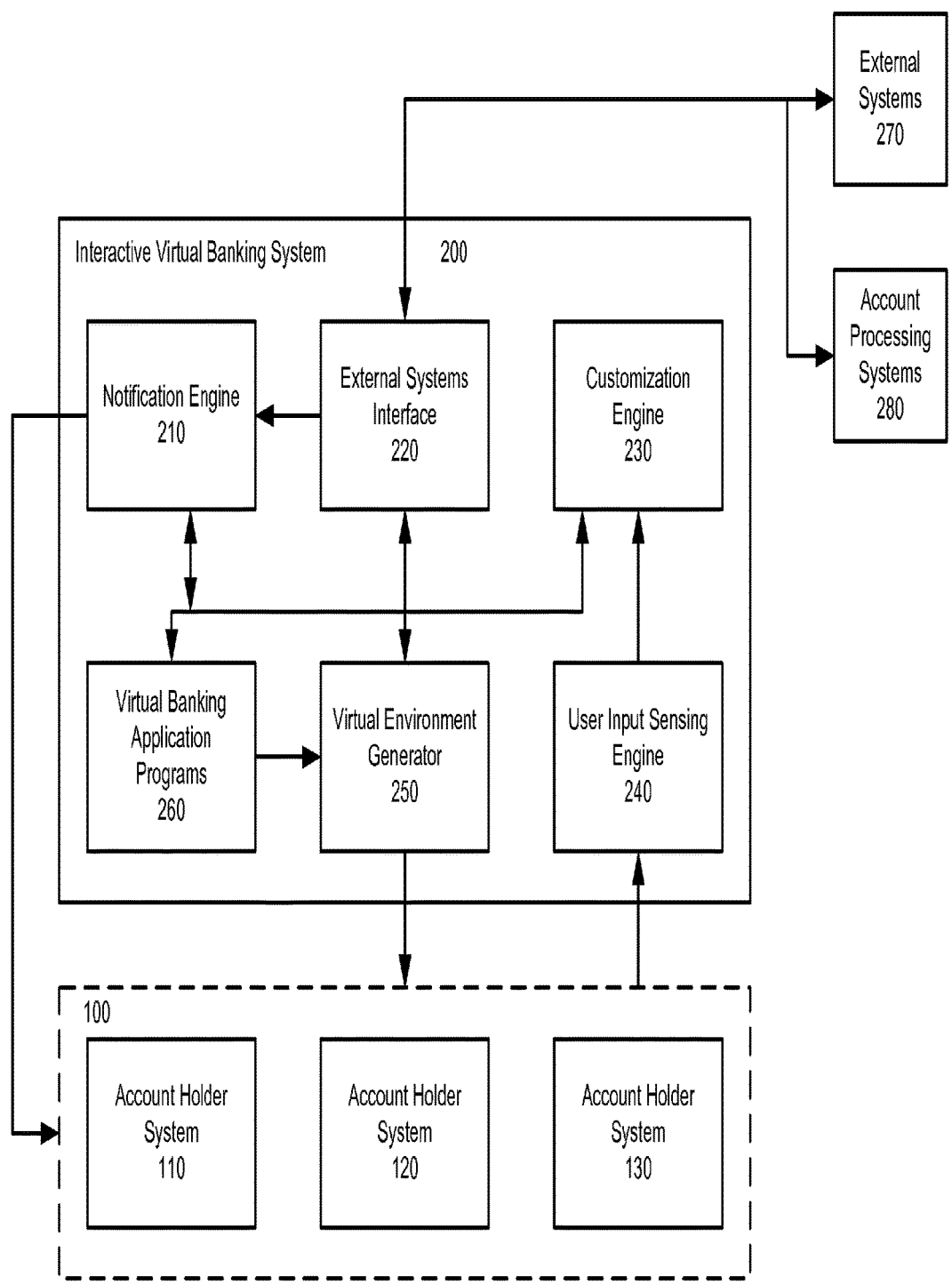
FIG. 2 is a block diagram illustrating components of the interactive virtual banking system and an exemplary process flow between the components in accordance with an embodiment of the invention.

FIG. 2 is a block diagram illustrating components of the interactive virtual banking system 200 and an exemplary process flow between the components in accordance with an embodiment of the invention. The interactive virtual banking system 200 may include, for example, a notification engine 210, external systems interface 220, customization engine 230, virtual banking applications 260, virtual environment generator 250, and user input sensing engine 240. It should be understood that although these components are shown as separate components communicating with one another, software components such as banking applications 260 may be stored by a computer memory and accessed and executed by a computer processor in operation. While the computer processing components and computer memory are not shown separately, their functionality is integrated with the components shown and they are fully described herein.

External systems 270 and account processing systems 280 may communicate with the interactive virtual banking system 200 through the external systems interface 220. The interactive virtual banking system 200 may also communicate with a user environment 100 including account holder systems 110, 120, . . . 130.

The notification engine 210 may include a software module executed by a computer processor in order to notify a system user of various events. Those events may include for example, account activity, including possible fraudulent activity, special offers, payment reminders, or notification of other approaching deadlines. The notification engine may process input such as user purchases or user daily activities in order to select special offers. The notification engine 210 may further sense whether a user owes money and route that user to a collections officer within the interactive virtual banking system 200. The collections officer may advise the user that the user is behind on a payment and make arrangements for collection. The notification engine 210 may also provide notification if fraud is suspected. The virtual bank representative may ask a user if he or she knows the person using the account. System equipment enables photographs and biometric measurements, such as fingerprints, for security so that suspicious activity can be detected. The notification engine 210 may receive information through the external systems interface 220 and transmit alerts through the virtual environment generator 250 or alternatively may transmit alerts outside of the virtual environment when appropriate.

The external systems interface 220 may accept input and send output to external systems that operate cooperatively with the interactive virtual banking system 200. As set forth respect to FIG. 1, the external systems may include merchant systems, banking systems such as account processing systems, databases, fraud monitoring systems and any other systems capable of communication with the interactive virtual banking system 200.

The customization engine 230 may include software modules stored in computer memory and executed by a computer processor that allow system users to customize their virtual environments. For example, system users may select avatars to represent themselves within the environment. The avatars may be displayed in the three dimensional environment interacting with bank personnel and performing banking tasks. System users may select a particular bank branch, or a particular region, country, or language in which the banking experience can be conducted. However, in embodiments of the invention, system users or customers are not represented by avatars. Rather, the users, can walk through or otherwise negotiate a virtual environment that may include avatars, such as avatars that represent banking personnel. Further, the user may customize bank branch representations or allow a default to customize the branch in accordance with the user's location. Customization options offered to the user may include various aesthetics that conform to the branding of the financial institution, yet allow variation of furniture, wall appearance, decor, teller representations, etc. Users may be able to select particular themes, such as "tropical", "ski vacation", "Gothic", "Classical", etc. Furthermore, the customization engine 230 may enable the user to restrict the system to following voice commands from a particular person. For example, if the user has children present, the user may instruct the system to ignore the children's voices. Similarly, the customization engine 230 could be instructed to provide smaller avatars to interact with the children, either to keep them occupied or to educate them regarding banking and savings accounts. Particular age groups may be targeted, such as teenagers, to educate those who may not normally bank. The customization engine 230 may further store a sequence of introductory scenes to be displayed to the user prior to the selection of a particular virtual banking application 260. The customization engine 230 may receive input from the user input sensing engine 240 and send output to the virtual environment generator 250. The introductory scenes may be displayed to show partner portals, such that users may interact with partners directly through the virtual banking environment.

The customization engine 230 may also operate to customized and provide live offers from the virtual banking environment when a user is utilizing a partner or other merchant application. This use may be detected by currently known techniques. If a user is shopping for cars, the virtual bank may offer a financing link which will enable the user to link the auto purchasing and auto financing experiences. The financing experience may bring the user into the virtual bank. These customized offers may be provided by the notification engine 210.

The virtual banking applications 260 may include various applications for performing banking tasks. The virtual environment generator 250 or other computer processor may access these applications from the computer memory in order to manipulate the interactive virtual environment in accordance with banking transaction requirements. The virtual environment generator 250 may vary depending on the user's location. If the user is at home, for an optimal experience, the user may implement a hologram generator, which displays the virtual environment as dictated by execution of the virtual banking applications 260. The hologram experience provides a three dimensional real-time experience and is further described below in connection with FIG. 5. However, in other embodiments of the invention, the virtual environment generator 250 may operate in order to be compatible with a home computing device, handheld computing device, or public computing device. For handheld device, the environment is typically miniaturized. However, if the device is capable, the system may offer the option of projecting the virtual environment from the handheld device onto a larger surface. Furthermore, the virtual environment may be generated for display on a large interactive screen, such as an Iwall. The virtual environment generator 250 is operative regardless of user location. However, it may measure light and provide different ways to interact if too much light is present for hologram interaction. The virtual environment generator 250 may also provide miniaturization both for handheld devices and for private modes of operation when requested by a user.

The user input sensing engine 240 operates to process user input in order to conduct banking transactions. The input may take various forms and preferably includes tactile or touch input and voice input. The input may also be keyboard input, motion input, and for the purpose of security monitoring, may include retinal input or thumbprint input. The user input sensing engine 240 is operational to sense any input that may be provided from user interface tools on any devices connected within each user system. As used herein, the user input sensing mechanism 240 may includes any hardware, software, or combination of hardware and software used by the processing machine that allows a user to interact with the computer processor or processing machine.

In embodiments of the invention, the virtual environment generator 250 may provide different doors for the user to walk through to see different information or services. These doors may include different portals, such as partner portals for linking to various partners, such as travel partners, educational partners, entertainment partners, or dining partners. In accordance with the functionality of the customization engine 230 described above, the partner portals may include those partners with which the user frequently conducts business. The branches and other portals may include touch sensitive signs and banners. Touching of the banners by a system user is detected by the user input sensing engine 240 and may prompt a response from an avatar within the system. The interactive experience also preferably provides both voice sensing and motion sensing capabilities. For example, when the user is standing in front of a bank branch, the user may reach out to open the door of the branch. Motion sensing technology would communicate with the interactive application to open the door to the branch on the three-dimensional display and to provide the user with an internal view of the bank branch. Alternatively, the user may say "Enter the bank" to cause the application to respond in the same manner. Thus, in a real time embodiment, the user may be able to see the bank branch in its current state to determine if the branch is open or if it is crowded, should the user want to visit the bank branch in person.

Figure 3:
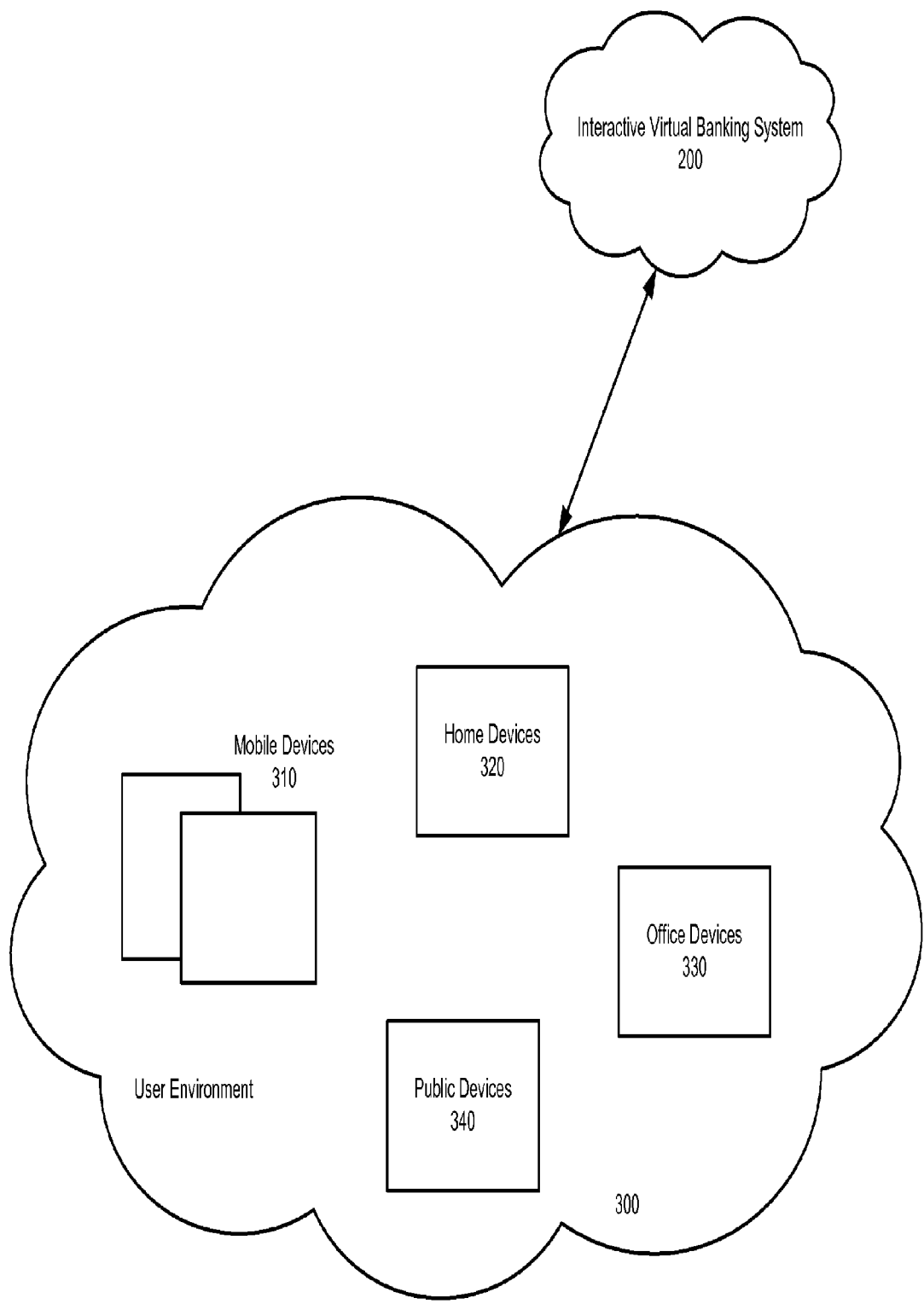
FIG. 3 is a block diagram illustrating a user environment connected with an interactive virtual banking system in accordance with an embodiment of the invention.

FIG. 3 is a block diagram illustrating an exemplary user environment 300 connected with the interactive virtual banking system 200 in accordance with an embodiment of the invention. As illustrated, the user environment 300 may include mobile devices 310, home devices 320, office devices 330, and public devices 340. Additional systems and devices may also be incorporated in the user environment.

Mobile devices 310 may include various known mobile computing devices, which also may be referenced as handheld devices, handheld computers or simply handhelds. These may be pocket-sized computing devices, typically having a display screen with touch input and/or a miniature keyboard. In the case of the personal digital assistant (PDA), the input and output are often combined into a touch-screen interface. The mobile devices 310 may also be or include Iphones, Ipads, net books, E-readers, tablet computers or other devices. Typically these devices are also equipped with cameras or other imaging devices.

Home devices 320 and office devices 330 may include any standard computing equipment implemented in homes and offices. Additionally, users may implement more sophisticated computing equipment to obtain the full benefit of the interactive virtual banking experience offered through the system. For example, users may implement large touch screens, supplemental holographic equipment, motion sensing equipment, voice recognition units (VRUs), or other technologies.

Public devices 340 may include any publicly available computing devices, such as large touch screens available, for example, in hotel lobbies and train stations. In preferred embodiments of the invention, users will be able to customize to enable different modes for public computing equipment and private computing equipment.

The interactive virtual banking system 200 can implement computer hardware and software specifically designed for the delivery of cloud services, including multi-core processors, cloud-specific operating systems and combined offerings. Cloud computing provides computation, software, data access, and storage services that do not require end-user knowledge of the physical location and configuration of the system that delivers the services. This implementation of the cloud computing concept provides a technique for increasing capacity investing in new infrastructure or training new personnel.

Figure 4:
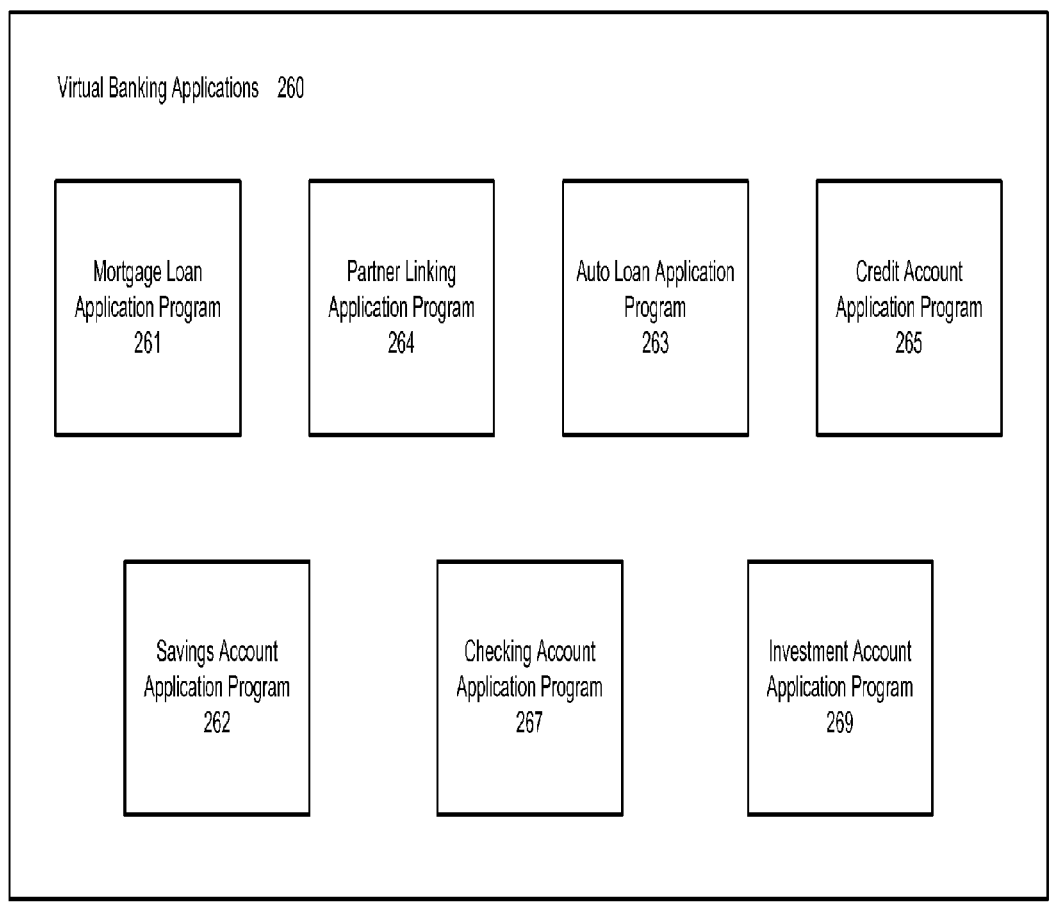
FIG. 4 is a block diagram illustrating an exemplary virtual banking applications in accordance with an embodiment of the invention.

FIG. 4 is a block diagram illustrating illustrative virtual banking application programs 260 in accordance with an embodiment of the invention. The virtual banking applications may include for example a mortgage loan application 261, a partner linking application program 264, an auto loan application 263, credit account application 265, savings account application 262, checking account application 267, and investment account application 269. All of these application programs may leverage existing applications that are used for example, in standard online application processing. They may include modifications or interface with plug-ins that adapt them for use with the interactive virtual environment.

The mortgage loan application 261 may provide information to the virtual environment generator 250 in order to perform the appropriate steps for obtaining a mortgage loan. Through the virtual environment generator 250, an avatar may be displayed to represent a mortgage loan officer to interact with the user or the user's avatar. The mortgage loan application program 261 enables the system to perform the steps of obtaining and approving information in the appropriate order in order to secure the mortgage loan for the user. The loan officer may receive much of the necessary application input orally from the user so that it is not necessary for the user to type out a full application. The auto loan application program 263 may provide similar servicing for an auto loan. Visual representation of a home or car, or a portion thereof, for example, the percentage owned by the user, could be provided for visual enhancement. Additional programs, applications or sub routines may accept payments and questions from users after the loans have been completed. Further applications may include an ATM interactive application program that allows users to interact with an ATM interface in order to make transfers or check balances.

The partner linking application program 264 may provide information to the virtual environment generator on how to represent or access partner web sites or environments. As set forth above, partner portals may be generated in a customized manner.

The credit account application program 265 may provide information to the virtual environment generator 250 including a program or programs executed to open an account, make payments, dispute payments, inquire about charges, or utilize credit rewards.

The savings account application 262 and the checking account application 267 may likewise provide information to the virtual environment generator 250 including a program or programs executed to open an account, make deposits, withdrawals, write checks, check balances, and transfer funds.

The investment account application 269 may likewise provide information to the virtual environment generator 250 including a program or programs executed to open the account, to redistribute funds, to check returns, and to ask questions.

In some instances, users may be able to fully complete transactions in the virtual environment. For example, a user may request cash, the virtual environment may be unable to deliver the cash. Similarly, other goods or services may be requested that cannot be transmitted through the virtual environment. Accordingly, the application programs may offer delivery or "will-call" options through which users can obtain these goods or services.

Figure 5:
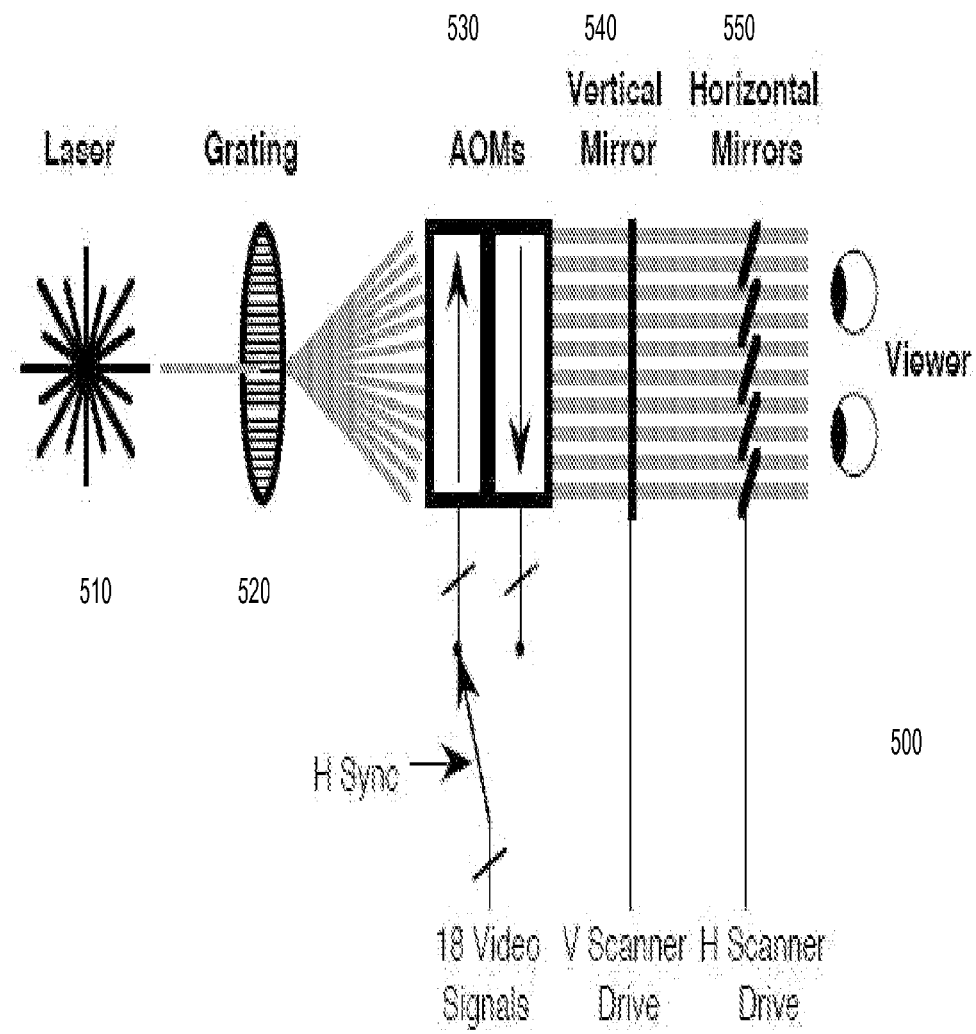
FIG. 5 illustrates a hologram generator usable in conjunction with embodiments of the invention.

FIG. 5 illustrates a hologram generator 510 usable in conjunction with embodiments of the invention. As set forth above, in embodiments of the invention, the virtual environment generator generates a hologram that appears as a three dimensional interactive environment. A laser 510 projects light beams towards grating 520. The light passing through the grating 520 encounters multiple parallel AOMs acousto-optic modulators (AOMs). From the AOMs 530, the light hits a system of mirrors including a vertical scanning system 540 and a horizontal scanning system 550. The operation of such a system to produce 3-Dimensional images is currently known in the art and is disclosed more fully, for example in "Real-Time Holographic Video images with commodity PC hardware" by Bove, Michael V. Jr., Wendy J. Plesniak, Tyeler Quentmeyer, and James Barabas, in Proc SPIE, 5664, 255 (2005). Other known holography techniques may alternatively be implemented.

Figure 6:
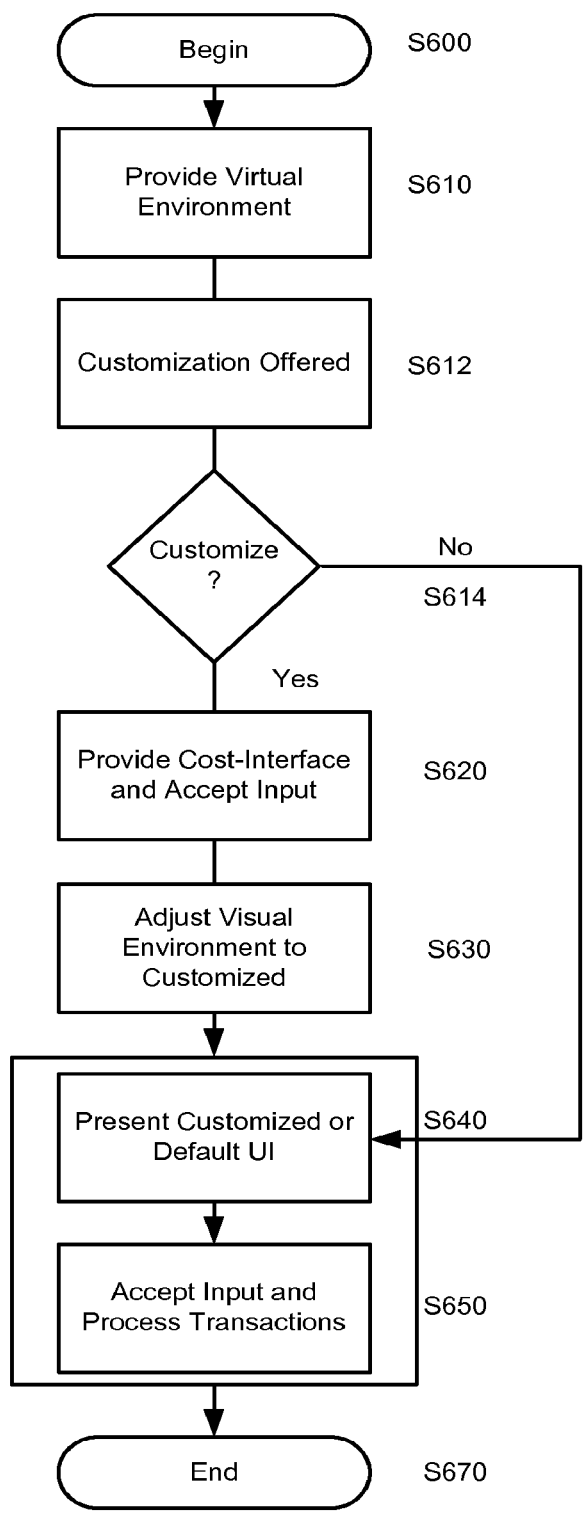
FIG. 6 is a flow chart illustrating a customization method in accordance with an embodiment of the invention.

FIG. 6 is a flow chart illustrating a customization method in accordance with an embodiment of the invention. The method begins in S600 and the system provides an interactive virtual environment in S610. In S612, the system may offer customization options through the interactive virtual environment. The customization options may alter subsequent images presented in the interactive virtual environment. For example, the customization options may allow the user to pick an avatar to represent his or herself and further to pick a home bank branch. The user may additionally be offered choice of language for interacting with other avatars, such as bank tellers within the interactive virtual environment. If the user chooses to customize in S614, the system provides a user interface accepting the input in S620 and adjusts the interactive virtual environment to arrive at the customized environment in S630. If in S614, the user does not choose to customize, the system reverts to a default virtual environment. Typically, the default virtual environment will include a user's home bank branch as determined based on stored data. If an avatar is used to represent the user, the avatar may be selected appropriate to the user's age and gender as determined based on stored data. The avatars representing branch tellers may be constructed to resemble the tellers at the selected branch.

In operation, when the user further interacts with the system, either a selected customized interface or the default interface will be presented in S640. In S650, the user will accept input and process transactions while maintaining the selected virtual environment through the entire process until the process ends in S670. While FIG. 6 proposes one customization process, it should be recognized that other customization processes can be used.

Figure 7:
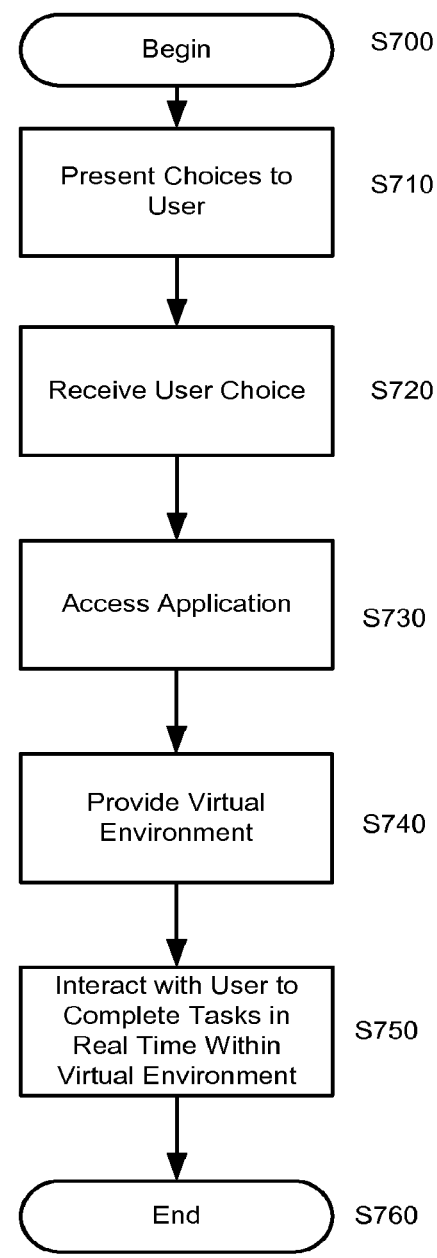
FIG. 7 is a flow chart illustrating a method for providing virtual banking services in accordance with an embodiment of the invention.

FIG. 7 is a flow chart illustrating a method for providing virtual banking services in accordance with an embodiment of the invention. The method begins in S700 and the interactive virtual environment presents choices to the user in S710. For example, the interactive virtual environment may provide options for filling out a loan application, performing simple banking tasks for checking or savings accounts, or altering distribution of funds in an investment account. As explained above, these choices may be offered by presenting the user with a rendering of a bank branch, with multiple doors, banners, tellers, etc. The rendering is optimally touch sensitive and responds to voice commands. In S720, the system receives a user choice and S730, the system retrieves the appropriate application for interacting with the user. In S740, the system provides the interactive virtual environment and in S750, the system interacts with the user to complete tasks in real time within the interactive virtual environment by executing the appropriate application within the customized or default virtual environment. The method ends in S760.

Figure 8:
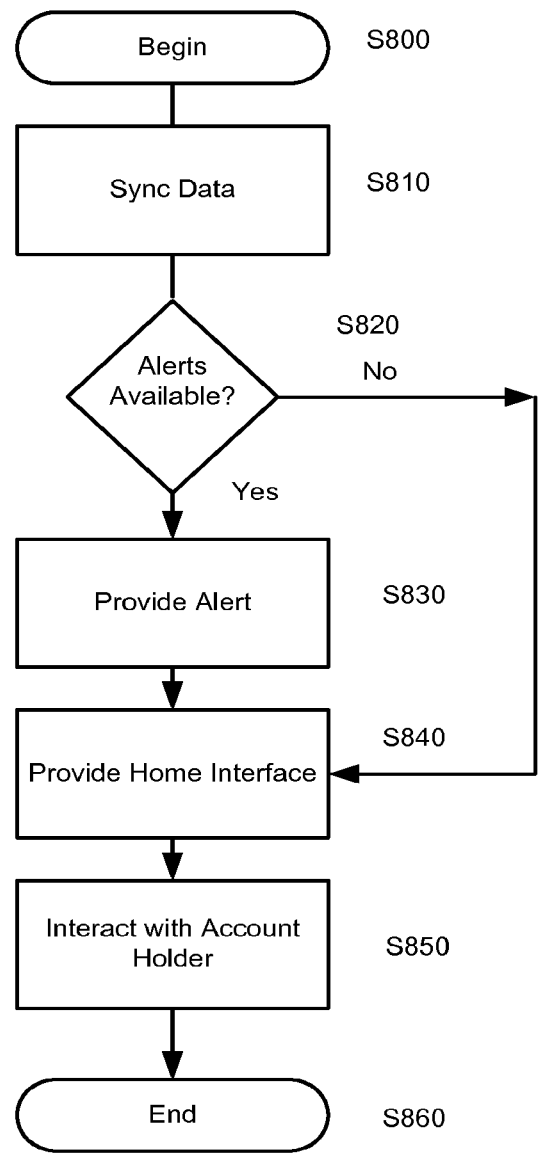
FIG. 8 is a flow chart illustrating a method for account holder interaction in accordance with an embodiment of the invention.

FIG. 8 is a flow chart illustrating a method for account holder interaction in accordance with an embodiment of the invention. The method of FIG. 8 may be implemented, for example, when an account holder enters his home. The method begins in S800 and in S810, the system detects user presence and synchronizes the devices within the user environment, such that the entire system if updated. As part of synchronization, the system may greet the user and provide updates based on the time of day, day of the week, calendar, or other preferences. In S820, the system determines if any alerts are available to the user. Alerts may include notification of credit card activity, of bank withdrawals, or of special offers available to the user. If the alert is available in S820, the system may provide the alert in S830. For example, the system may tell the user "You have an alert from your bank, would you like to play it now?" The user may then elect to play the alert or to hear it at a later time. Typically, the user election may be made vocally, with the system using known voice recognition technology.

If no alert is available, the system may provide a home interface in S840, which may be the user's bank branch or other selected home interface. In S850, the system interacts with the account holder by reacting to the account holder's voice or touch or other type of input. The method ends in S860.

Figure 9A:
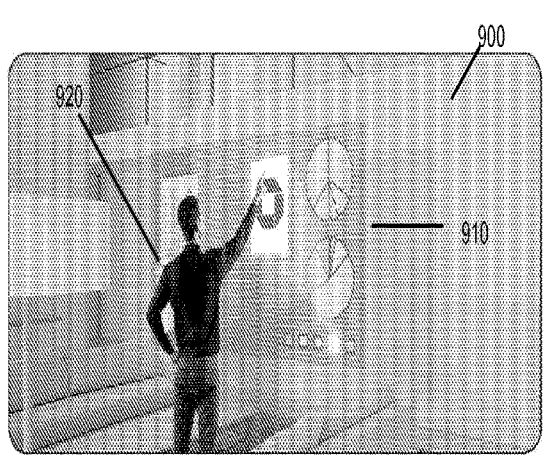
FIGS. 9A-9F are renderings of an interactive virtual environment in accordance with embodiments of the invention.

FIGS. 9A-9F are renderings of an interactive virtual environment in accordance with embodiments of the invention. In the displayed embodiment, the user is not represented by an avatar. Rather, the user is pictured in the virtual banking environment making selections through voice and touch sensitive input mechanisms. FIG. 9A illustrates a user's home environment 900, which, in embodiments of the invention, he may generate using his voice or by gesture within his home. The user 920 may activate the interactive virtual environment 900 to include account data 910 so that he can transfer funds between accounts or perform an alternative function. All of the familiar confines of the user's home bank branch may appear in the user's living room.

Figure 9B:
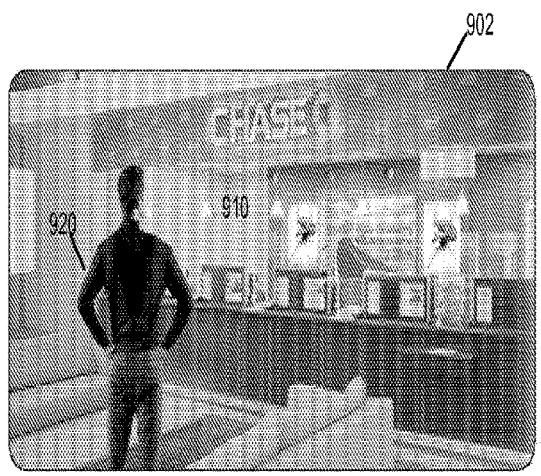

FIG. 9B illustrates an interactive virtual environment 902 that includes a special message 910 for the user 920. The special message indicates that auto financing is available for as little as 2.25%. The user 920 has been considering buying a car and selects "apply now" to apply for a loan.

Figure 9C:
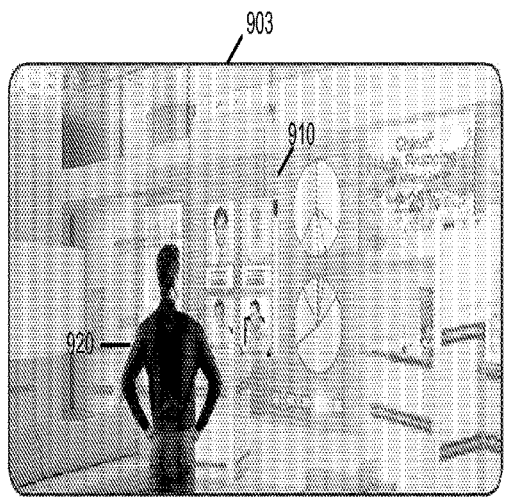

FIG. 9C illustrates an interactive virtual environment 903 transformed in response to the request to apply for an auto loan. More specifically, the user environment switches from a teller window to the loan officers. The user 920 is shown a queue 910 of live loan officers available to talk with him and help him complete his application. He may be able to preview a video identifying the loan officers including, their names, hometowns, short biography, and areas of expertise. The user 920 then is able to select one of the available loan officers.

Figure 9D:
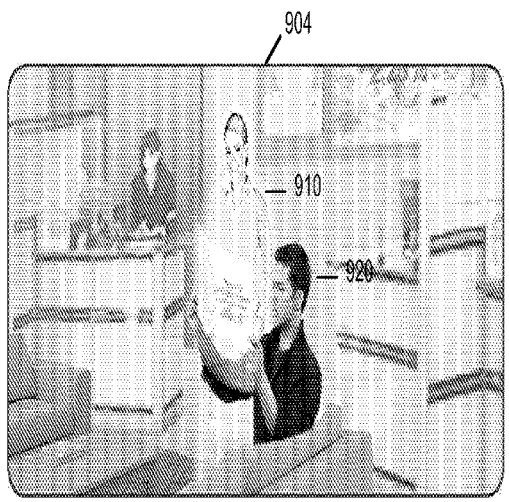

FIG. 9D illustrates an interactive virtual environment in which the loan officer 910 is shown. The user 920 discusses the available rates and application process with the loan officer. The loan officer finalizes his application. In preferred embodiments of the invention, the user is not required to write or type. The loan officer 910 hands the user 920 a final draft of the application for review.

Figure 9E:
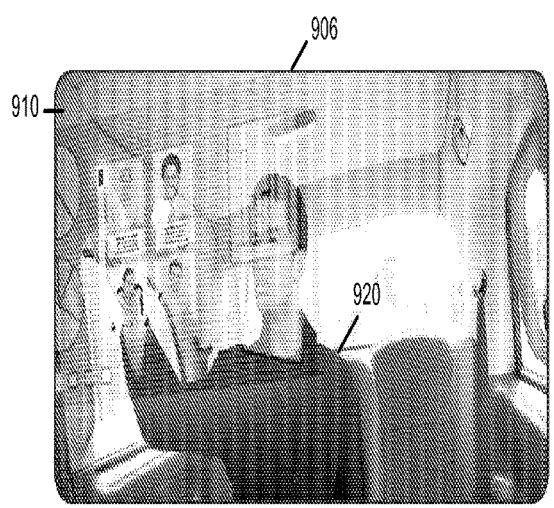

FIG. 9E illustrates an interactive virtual environment 906 in which the user 920 has used his mobile device to transfer is information to a surface to appear three dimensionally around him. The information in this instance is projected on the back of the glass of a taxi cab. The information may be retinally secure, so only the user can see it. He may be able to see, for example, a summary of transactions from the last five days.

Figure 9F:
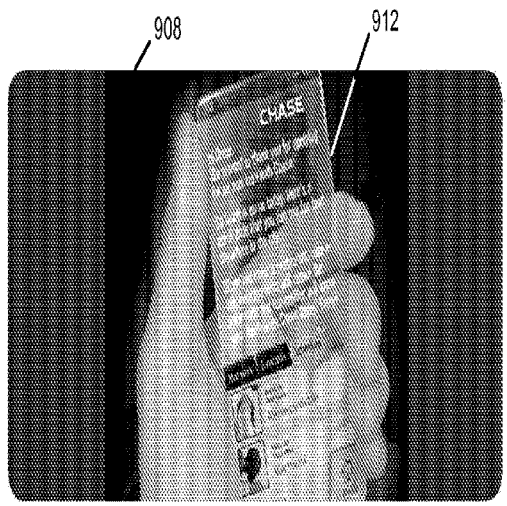

FIG. 9F shows a message 908 on a handheld device 912 that thanks the user for applying for an auto loan and offers him a free lunch. The message provides a code that he can use for food by providing it to the cashier.

The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, which enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer-implemented interactive virtual banking system for connecting a user environment, including an account holder computing system, with a banking environment for facilitating banking transactions, the system comprising:
   a computer memory disposed within the interactive virtual banking system and storing a plurality of programs including banking application programs;
   an interactive virtual environment generator for generating an interactive virtual banking environment, the interactive virtual banking environment including visual and audio components depicting a rendering of a bank branch;

a user input sensing system for accepting and interpreting user input received in the interactive virtual banking environment generated by the interactive virtual environment generator, wherein the sensing system senses a user presence in the interactive virtual banking environment and synchronizes all user devices upon sensing the user presence; and computer processing components for accessing the stored programs including the banking application programs and executing the stored programs to perform steps including;

providing customization options allowing the user to enter input to select customized features of a bank branch within the generated interactive virtual banking environment;

providing a rendering of multiple portals for the customized bank branch within the generated interactive virtual banking environment, the multiple portals each associated with different services;

sensing user input through the user input sensing mechanism, the user input requesting entry into one of the multiple portals;

responsive to the user input, selecting and retrieving an application from the computer memory; and providing the interactive application, over the Internet to the account holder computing system, for allowing the user to receive the service associated with the selected portal in the customized interactive virtual banking environment.

2. The system of claim 1, wherein the portals include renderings of a teller window, a loan officer, and a sales office.

3. The system of claim 2, wherein the portals provide live transaction options through video chat.

4. The system of claim 1, wherein at least one of the multiple portals is a partner portal providing access to a merchant service available from a merchant partner of the bank branch.

5. The system of claim 1, wherein the customization options enable the user to customize at least a spoken language within the interactive virtual banking environment.

6. The system of claim 5, wherein the customization options enable customization of a user avatar within the interactive virtual banking environment.

7. The system of claim 1, wherein the user input sensing system accepts tactile input and voice input from the user within the interactive virtual banking environment.

8. The system of claim 1, wherein the user input sensing system senses motion of the user within the interactive virtual banking environment.

9. The system of claim 1, further including an external systems interface for receiving customized offers from a central offer engine and providing the customized offers within the interactive virtual banking environment.

10. The system of claim 1, further comprising a notification engine for providing banking alerts to the user within the interactive virtual banking environment.

11. The system of claim 1, wherein the interactive virtual banking environment comprises audio cues presented by at least one virtual teller within the home bank branch.

12. The system of claim 11, wherein the interactive virtual banking environment comprises multiple transaction options available accessible through visual and audio input from the user.

13. The system of claim 1, wherein the rendering is a three dimensional holographic rendering.

14. The system of claim 1, wherein the rendering is projected from a device to a surface area.

15. The system of claim 1, wherein the virtual environment generator generates a default bank branch in the interactive virtual banking environment when the user does not customize the bank branch, the default bank branch comprising a home bank branch.

16. The system of claim 1, wherein the customization options further facilitate generation of interactive offers from partner merchants for display in the virtual interactive banking environment.

17. A computer-implemented interactive virtual banking method for connecting a user environment, including an account holder computing system, with a banking environment for facilitating banking transactions, the method comprising:

storing a plurality of programs including banking application programs in a computer memory;

generating an interactive virtual banking environment using a virtual environment generator, the interactive virtual banking environment including visual and audio components and a rendering of a bank branch selected by the user;

sensing user input into the interactive virtual banking environment using a user input sensing system for accepting and interpreting user input received in the interactive virtual banking environment generated by the interactive virtual environment generator, wherein the sensing system senses a user presence in the interactive virtual banking environment and synchronizes all user devices upon sensing the user presence; and accessing the stored programs including banking application programs and executing the stored programs using a computer processor to perform steps including;

providing customization options allowing the user to enter input to select customized features of a bank branch within the generated interactive virtual banking environment;

providing a rendering of multiple portals for the customized bank branch within the generated interactive virtual banking environment, the multiple portals each associated with different services;

sensing user input through the user input sensing mechanism, the user input requesting entry into one of the multiple portals;

responsive to the user input, selecting and retrieving an application from the computer memory; and providing the interactive application over the Internet to the account holder computing system, for allowing the user to receive the service associated with the selected portal in the customized interactive virtual banking environment.

18. The method of claim 17, wherein the portals include renderings of a teller window, a loan officer, and a sales office.

19. The system of claim 18, wherein the portals provide live transaction options through video chat.

20. The method of claim 17, wherein at least one of the multiple portals is a partner portal providing access to a merchant service available from a merchant partner of the bank branch.

21. The method of claim 17, wherein the customization options enable the user to customize at least a spoken language within the interactive virtual banking environment.

22. The method of claim 17, wherein the customization options enable customization of a user avatar within the interactive virtual banking environment.

23. The method of claim 17, further comprising accepting tactile input and voice input from the user within the interactive virtual banking environment.

24. The method of claim 17, further comprising sensing motion of the user within the interactive virtual banking environment.

25. The method of claim 17, further receiving customized offers through an external systems interface from a central offer engine and providing the customized offers within the interactive virtual banking environment.

26. The method of claim 17, further comprising providing banking alerts to the user within the interactive virtual banking environment.

27. The method of claim 17, wherein the interactive virtual environment comprises audio cues presented by at least one virtual teller within the home bank branch.

28. The method of claim 27, further comprising generating, in the interactive virtual banking environment, multiple transaction options available accessible through visual and audio input from the user.

29. The method of claim 17, wherein the rendering is a three dimensional holographic rendering.

30. The system of claim 17, wherein the rendering is projected from a device to a surface area.

31. The method of claim 17, further comprising generating a default bank branch in the interactive virtual banking environment when the user does not customize the bank branch, the default bank branch comprising a home bank branch.

32. The method of claim 17, further comprising generating interactive offers from partner merchants for display in the virtual interactive banking environment.

* * * * *